United States Patent
Kamay et al.

(10) Patent No.: US 9,507,620 B2
(45) Date of Patent: *Nov. 29, 2016

(54) ADJUSTING CLIENT DISPLAY DEVICES BASED ON SETTINGS INCLUDED IN A NOTIFICATION FROM REMOTE VIRTUAL MACHINE HOST PRIOR TO CONNECTION ESTABLISHMENT

(71) Applicant: Red Hat Israel, Ltd, Raanana (IL)

(72) Inventors: Yaniv Kamay, Modi' (IL); Arnon Gilboa, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 228 days.

This patent is subject to a terminal disclaimer.

(21) Appl. No.: 13/922,195

(22) Filed: Jun. 19, 2013

(65) Prior Publication Data

US 2013/0283272 A1 Oct. 24, 2013

Related U.S. Application Data

(63) Continuation of application No. 12/475,541, filed on May 31, 2009, now Pat. No. 8,473,958.

(51) Int. Cl.
| | |
|---|---|
| *G06F 9/455* | (2006.01) |
| *G06F 3/00* | (2006.01) |
| *G06F 15/16* | (2006.01) |
| *G06F 9/44* | (2006.01) |

(52) U.S. Cl.
CPC ......... *G06F 9/45558* (2013.01); *G06F 9/4443* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,285,857 B2 | 10/2012 | Hochmuth et al. | |
| 2005/0132091 A1* | 6/2005 | Shibata | 710/4 |
| 2007/0124474 A1 | 5/2007 | Margulis | |
| 2007/0174410 A1* | 7/2007 | Croft et al. | 709/208 |
| 2009/0235177 A1* | 9/2009 | Saul et al. | 715/740 |
| 2010/0115020 A1 | 5/2010 | Hochmuth et al. | |

OTHER PUBLICATIONS

"Solid Ice: Connection Broker," Qumranet, Apr. 2008, 7 pages.
"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Overview," Qumranet, Apr. 2008, 15 pages.
"KVM—Kernel-based Virtualization Machine," Qumranet, white paper, 2006, 5 pages.

* cited by examiner

*Primary Examiner* — Bing Zhao
(74) *Attorney, Agent, or Firm* — Lowenstein Sandler LLP

(57) ABSTRACT

A method and system for the display device configuration in a VM environment are disclosed. In one embodiment, the method includes determining one or more devices in a display system of a client and transmitting client display system information to a host running one or more VMs. Further, a notification is received by the client from the host indicating that display settings of the VM were configured based on the client display system information.

20 Claims, 6 Drawing Sheets

ADJUSTING CLIENT DISPLAY DEVICES BASED ON SETTINGS INCLUDED IN A NOTIFICATION FROM REMOTE VIRTUAL MACHINE HOST PRIOR TO CONNECTION ESTABLISHMENT

RELATED APPLICATIONS

The present application is a continuation of U.S. patent application Ser. No. 12/475,541, filed May 31, 2009, entitled "ADJUSTING CLIENT DISPLAY DEVICES BASED ON SETTINGS INCLUDED IN A NOTIFICATION FROM REMOTE VIRTUAL MACHINE HOST PRIOR TO CONNECTION ESTABLISHMENT," which is incorporated by reference herein.

TECHNICAL FIELD

The embodiments of the invention relate generally to virtual machine systems and, more specifically, relate to display system device configuration in a virtual machine environment.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (guest OS) and software applications (processes). Typically, a virtual machine manager (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including guest operating systems. The VMM virtualizes the underlying hardware of the host machine or emulates hardware devices, making the use of the VM transparent to the guest operating system or the remote client that uses the VM.

A VM may include one or more applications that generate data (e.g., images, video, etc.) to be displayed at a physical display device of the host machine. When generating this data, an application takes into consideration settings of the display device such as resolution, orientation, display position, color depth, sub-pixel order, etc. However, a VM may be woken up after the settings of the physical display device were changed by a user, resulting in a mismatch between the display settings of the VM and the current settings of the physical display device.

Further, a VM may run in a virtual desktop environment, in which a centralized server is partitioned into multiple VMs that host the virtual desktops, thereby providing a desktop for each user. The centralized hosting provides the manageability of sever-based computing, while the dedicated environment provides the flexibility and compatibility with applications that a desktop enables. In general, VMs therefore enable remote access to a host or server computer by a remote client computer, which mimics or reconstructs the events taking place on the host computer. However, currently there is no mechanism that would provide an automatic correspondence between the display settings of the VM and those of the remote client.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
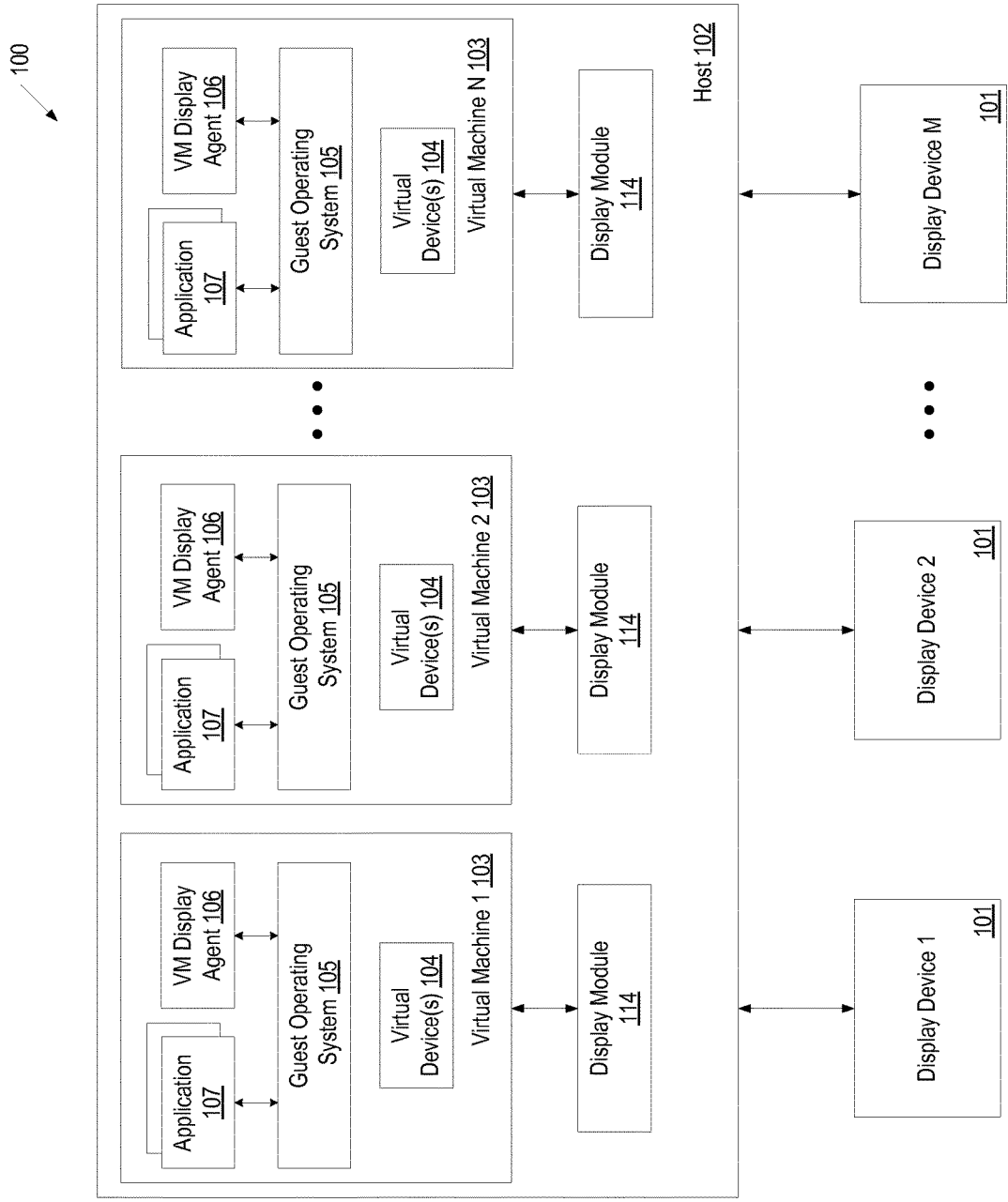
FIG. 1 is a block diagram of a system for providing display system device configuration in a local host environment according to one embodiment of the invention.

A method and system for configuring display devices in a virtual machine (VM) system are described herein. In one embodiment, a method of configuring display devices in a VM system includes receiving information of a physical display system. This physical display system information may identify one or more devices in the physical display system and specify current settings of each display device. Based on the physical display system information, the display device settings of the VM are adjusted to fit the specific requirements of the user. In one embodiment, the adjustment also takes into account the abilities and/or limitations of the specific VM.

The above mechanism may be applicable to a local host environment, in which the display device settings of the VM are adjusted based on the settings of the display system of the host. In addition, or alternatively, the above mechanism may be applicable to a remote host environment, in which the display settings of the VM are adjusted based on the settings of the display system of a client coupled to a VM host via a network.

In the following description, numerous details are set forth to provide a more thorough explanation of the embodiments of the present invention. It will be apparent, however, to one skilled in the art, that the present invention may be practiced without these specific details. In some instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention.

The appearances of the phrase "in one embodiment" in various places in the specification do not necessarily all refer to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "deleting", "configuring", "enabling", "disabling", "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 is a block diagram of a system 100 that provides display device configuration in a local host environment according to embodiments of the invention. System 100 includes one or more display system devices 101 communicatively coupled to a host computer 102. The display system devices 101 may include such devices as a computer monitor, a graphics card, a display adapter, or any other device that is involved in rendering data on a screen. The display system devices 101 are part of the hardware platform 110 of the host 102. The hardware platform may include a memory, a processor, and other hardware of the host machine 102.

Computer 102 hosts one or more VMs 103, each having one or more applications 107. An application 107 may be executed and hosted by an operating environment (e.g. an operating system) within VM 103. Such an operating system in VM 103 is also referred to as a guest operating system 105. Multiple guest operating systems and the associated VMs may be controlled by another operating system, known as a host OS or a virtual machine monitor (VMM) 112 for managing the hosted VMs. The VMM 112 may also be referred to as a hypervisor or a kernel-based virtual machine (KVM).

A guest OS 105 may be of the same or different type with respect to the host OS. For example, a guest OS may be a Windows™ operating system from Microsoft and a host OS may be a Linux operating system available from Red Hat. In addition, the guest OSes 105 can be of the same or different types.

VM 103 can be any type of virtual machines, such as, for example, hardware emulation, full virtualization, para-virtualization, and operating system-level virtualization virtual machines. Different VMs 103 hosted by computer 102 may have the same or different privilege levels for accessing different resources.

In one embodiment, each VM 103 has one or more virtual display devices 104 that emulate physical display devices. A virtual display device 104 may be in the form of a display driver supported by a relevant guest OS 105, or some other software providing similar functionality. The virtual display device 104 may store display device settings for the VM 103 that may include, for example, resolution, display position, orientation, color depth, sub-pixel order, etc. Options for the settings of the virtual display device 104 may be limited to those supported by the guest OS 105.

In one embodiment, the host 102 includes a display module 114 that may be part of the VMM 112 or a hardware emulation layer, a plugin for the VMM 112 or the hardware emulation layer, or an independent module running on top of the VMM 112. Prior to establishing a display connection between the VM 103 and display system devices 101, the display module 114 collects the settings of the currently active display system devices 101 and sends them to the VM 103. These settings may be updatable by a user of the host 102 or set by the host 102 based on default parameters or specific criteria.

In one embodiment, the display device settings of the VM are the settings of the virtual display devices 104. Based on the received data, the VM display agent 106 determines which of the display system devices 101 are currently inactive, and disables corresponding virtual display devices 104. For each active display system device 101, the VM display agent 106 determines whether the settings of a corresponding virtual display device 104 differ from the current settings of the active display system device 101. If so, the VM display agent 106 updates the settings of the virtual display device 104 with the current settings of a corresponding display system device 101.

In one embodiment, the guest OS 105 includes a VM display agent 106 that is responsible for adjusting display device settings of the VM 103 based on current settings of the display system device(s) 101. The VM display agent 106 receives data identifying active display system devices 101 and the settings of the active display system devices 101 from the display module 114. The settings of the display system device(s) 101 may include resolution, display position, orientation, color depth, sub-pixel order, etc.

In one embodiment, prior to making the update, the VM display agent 106 determines whether the corresponding virtual display device 104 supports the current settings of the active display system device 101. If so, the settings of the virtual display device 104 are updated with the received settings. Alternatively, if the virtual display device 104 does not support the received settings, the VM display agent 106 determines whether the received data contains one or more alternate settings. If the received data contains one or more alternate settings, the VM display agent 106 determines which alternate settings have the highest priority and then determines if those alternate settings are supported by the virtual display device 104. If the alternate settings are supported, the VM display agent 106 updates the settings of the virtual device 104 with the alternate settings. If the alternate settings with the highest priority are not supported, then the VM display agent 106 looks for additional alternates for the settings in order of priority. The VM display agent 106 continues this process until the virtual display device 104 has been updated or there are no additional alternate settings in the received data.

In another embodiment, the VM display agent 106 does not make any updates to the settings of the virtual display device 104 if the initial received settings are not supported.

Next, the VM display agent 106 establishes a connection between the VM 103 and the display system device 101 (e.g., using a separate channel for each active display system device 101), and sends a notification to the display module 114, specifying the current settings of the virtual display devices 104. In response, the display module 114 can update the settings of the display device 101 if needed to match to the settings of the virtual display devices 104. The communication between the VM 103 and the display system devices 101 can then take place using the established channel connections.

Figure 2:
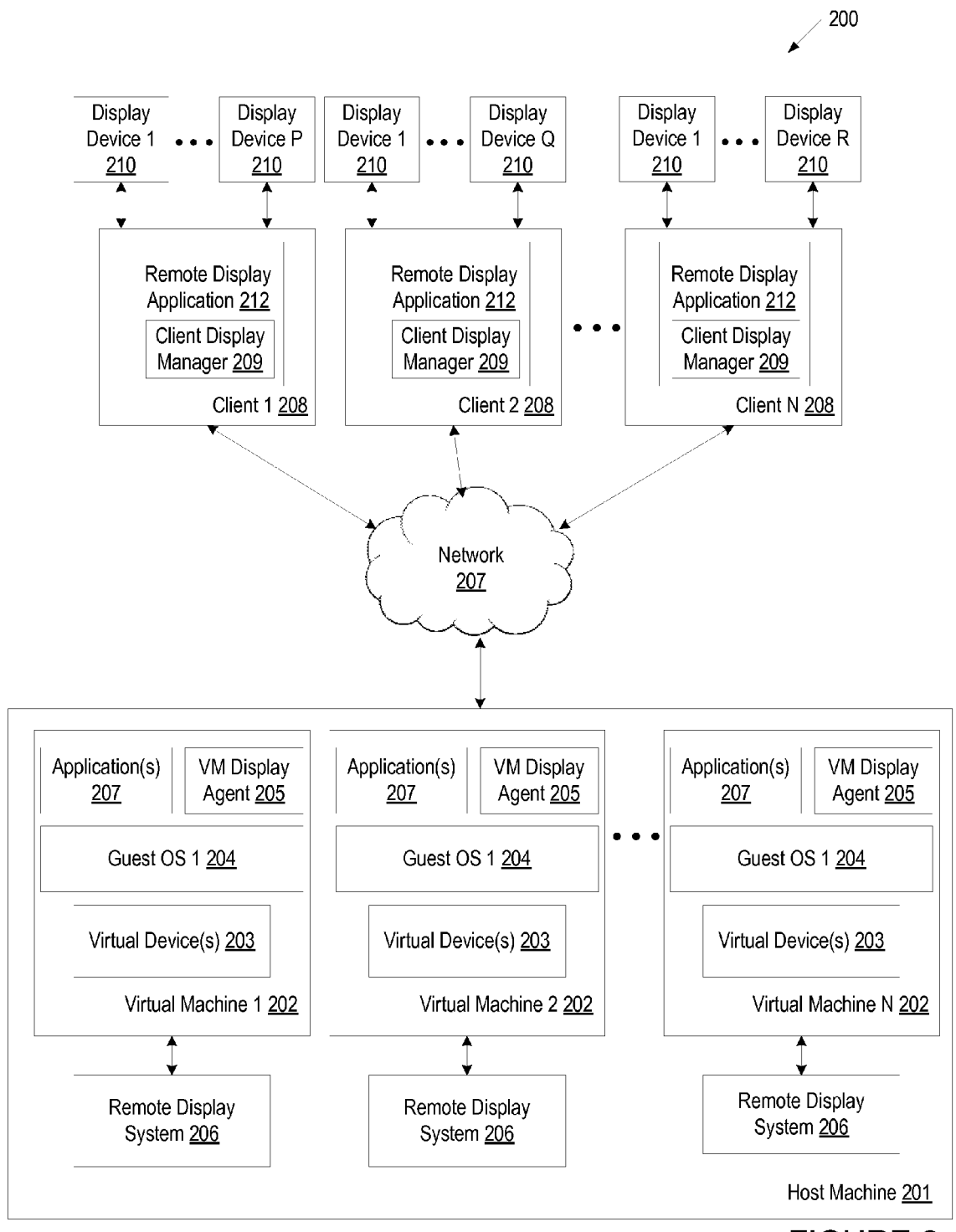
FIG. 2 is a block diagram of a system for providing display system device configuration in a remote host environment according to one embodiment of the invention.

FIG. 2 is a block diagram illustrating a system 200 for providing display system device configuration in a remote host environment according to one embodiment of the invention. System 200 includes one or more clients 208 communicatively coupled to a host machine or a cluster of host machines 201 over a network 207. Network 207 may be a local area network (LAN) or a wide area network (WAN) and may be a combination of one or more networks. Client 208 may be any computer system in communication with host machine 201 for remote execution of applications at host machine 201. Each client 208 is communicatively coupled to one or more client display system devices 210. The client display system devices 210 may include such devices as a computer monitor, a graphics card, a display adapter, or any other device that can store display information or render data on a screen. The settings of the client display system device 210 may be updatable based on input provided by the user of the client 208 or by the client 208 itself. The settings of the client device 210 may include display position, orientation, color depth, sub-pixel order, or any other aspects of display resolution.

The host machine 201 is configured to host one or more VMs 202, each having a guest operating system 204. Multiple guest OSes and the associated VMs may be controlled by another operating system (also referred to as a host OS, VMM, hypervisor, or KVM engine). Each VM 202 may include one or more applications hosted by corresponding guest OSes 204. Each VM 202 can communicate to one or more clients 208. In one embodiment, each virtual machine 202 hosts or maintains a desktop environment providing virtual desktops for remote clients 208. In some embodiments, client 208 may be a thin client with sufficient resources to enable a user to interact with a virtual desktop provided by VM 202. A virtual desktop can represent an output (e.g., an image to be displayed) generated by a desktop application 207 running within VM 202. Graphics data associated with the virtual desktop can be captured and transmitted to client 208, where the virtual desktop may be rendered by a rendering agent and presented by a client application.

Client 208 hosts a client display system manager 209 that collects client display system information. The client display system information may include a list of all the client display system devices 210 which are active on the client 208, and the settings of each client display system device in the list. In one embodiment, client display system manager 209 collects the client display system information in a "pre-connect" stage (prior to establishing display connections with the VM 202). Further, client display system manager 209 connects to the host through the network 207, and sends the client display system information to the host 201.

In one embodiment, the host 201 includes a remote display system 206 for each VM 202. The remote display system 206 may be part of the VMM or a hardware emulation layer, or run on top of the VMM. The remote display system 206 receives the client display system information sent by the client 208 and passes the client display system information to the VM 202. The VM 202 uses this information to adjust its display settings accordingly. The display settings of the VM 202 may be, for example, configuration parameters for virtual display devices 203 of the VM 202.

In one embodiment, each VM includes a VM display agent 205 that is part of the guest OS 204. The VM display agent 205 uses the client display system information to update the settings of virtual display devices 203. In one embodiment, the VM display agent 205 disables virtual display devices 203 that do not have corresponding client devices in the list of active client display devices, enables virtual display devices 203 that correspond to active client display devices 210 from the list, and then determines whether an enabled virtual display device 203 supports the current settings of the corresponding client display device 210. If so, the settings of the virtual display device 203 are updated with the current settings of the corresponding client display device 210. If not, the VM display agent 205 determines whether the client display system information contains one or more alternate settings for the virtual display device 203. If alternate settings are specified, the VM display agent 205 determines which alternate settings have the highest priority and whether those alternate settings are supported. If the alternate settings are supported, the VM display agent 205 updates the settings of the virtual display device 203 with the alternate settings. If the alternate settings are not supported, then the VM display agent 205 looks for additional alternate settings in order of priority. The VM display agent 205 continues this process until the virtual display device 203 has been updated or there are no additional alternate settings in the received information.

In another embodiment, the VM display agent 205 does not make any updates to the settings of the virtual display device 203 if the settings contained in the client display system information are not supported.

The VM display agent 205 then establishes a connection with the client 208 (e.g., via separate channels for individual display devices 210), and sends a notification to the remote display system 206 specifying the current display settings of the VM 202. The remote display system 206 receives the notification from the VM display agent 205 and passes the notification to client 208 through network 207. At client 209, the client display system manager 209 compares the settings of the active client display devices 210 with the received settings of the VM 202, and if they are different, updates the settings of the active client display devices 210 with the received settings of the VM 202. The communication between the VM 202 and the client display devices 210 can then take place using the established channel connections Accordingly, systems 100 and 200 automatically match display device settings of the VM with preferred settings of the physical display system that renders data generated by the VM. When performing the matching, systems 100 and 200 take into account the abilities and/or limitations of the VM and the physical display system. As a result, the user involvement is minimized and the quality of data presentation is improved.

Figure 3:
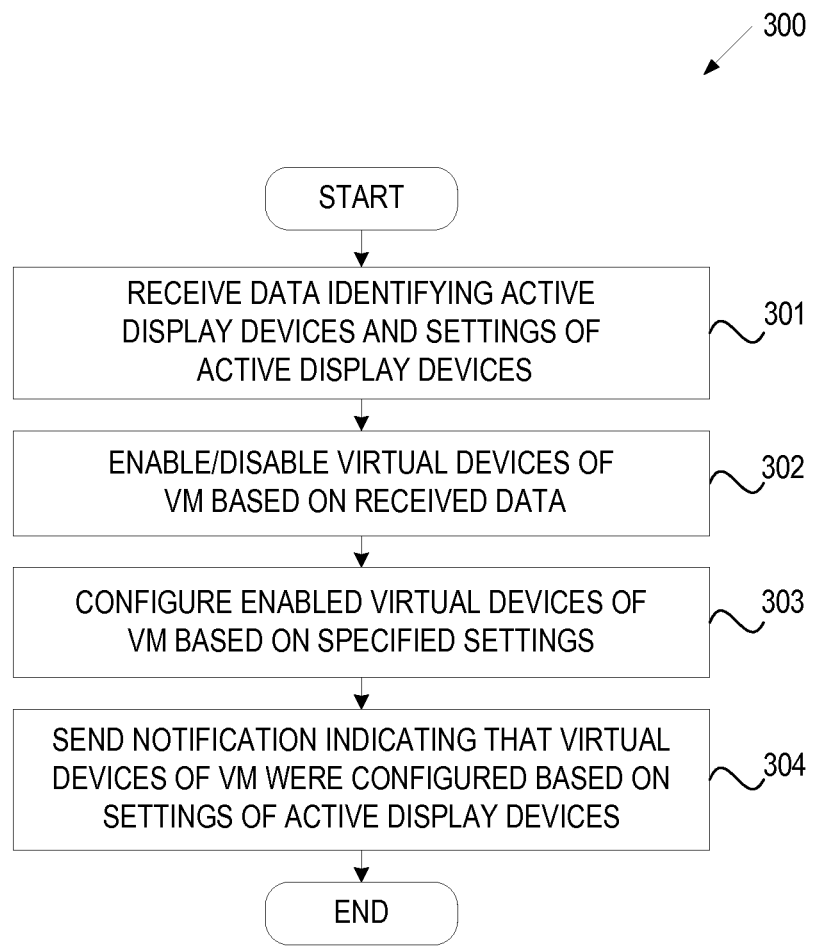
FIG. 3 is a flow diagram illustrating a method for providing display system device configuration in a local host environment according to an embodiment of the invention.

FIG. 3 is a flow diagram illustrating a method for providing display device configuration in a local host environment according to one embodiment of the invention. Note that method 300 may be performed by processing logic which may include software, hardware, or a combination of both. For example, method 300 may be performed by system 100 of FIG. 1.

Method 300 begins at block 301 where a VM display agent receives a list of active devices of the host's display system and current settings of the active display devices. The list may be received from a display module which collects current settings of the host's display system during the "pre-connect" stage (prior to establishing display connections between the VM and the display devices of the host). The display module may be part of, or a plugin for, the VMM or a hardware emulation layer, or be an independent module running on top of the VMM.

At block 302, the VM display agent determines which active display devices are included in the list, enables corresponding virtual display devices, and disables virtual display devices that do not have corresponding devices in the list. At block 303, the VM display agent configures the settings of enabled virtual display devices according to the received data. In one embodiment, the VM display agent first determines whether the specified settings are supported. If so, the VM display agent updates the settings of the virtual display devices with the specified device settings. If not, the VM display agent determines which alternate desired device settings have the highest priority. If the alternate desired device settings are supported, the virtual display device are updated with the alternate settings. If the alternate desired device settings are not supported, the VM display agent continues to make the determination for each of the alternate device settings provided in order of priority until finding alternate device settings which are supported by the virtual display device or until exhausting the list. If the list does not include alternate device settings that are supported by the virtual display device, the VM display agent uses default settings for the virtual display device.

At block 304, the VM display agent establishes display connections with the host display devices (e.g., via separate channels for individual display devices), and sends a notification to the display module, specifying the resulting display settings of the VM. The display module then compares the received settings of the VM with the settings of the host display devices, and if they are different, updates the settings of the host display devices with the settings of the VM. The communication between the VM and the host display devices can then take place using the established channel connections.

Figure 4:
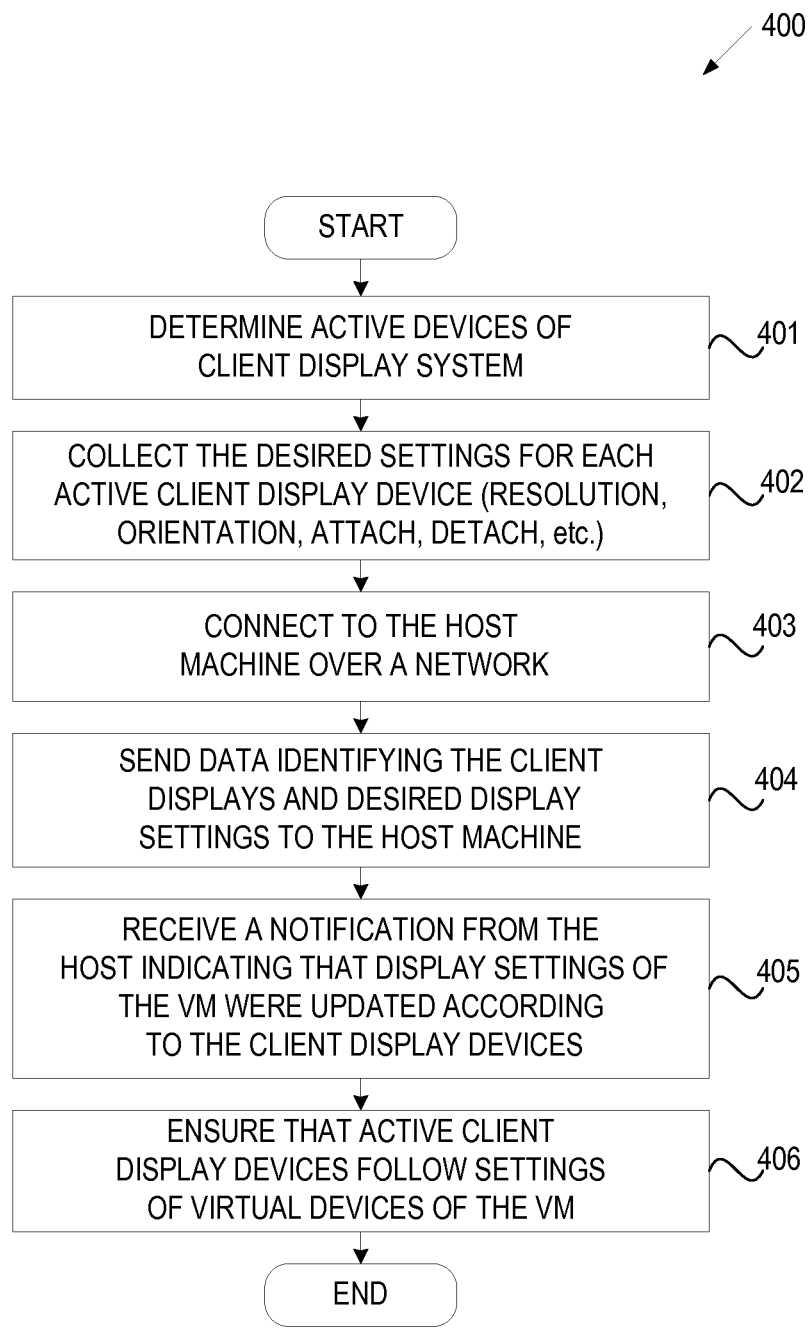
FIG. 4 is a flow diagram illustrating a client-based method for providing display system device configuration in a remote host environment according to an embodiment of the invention.

FIG. 4 is a flow diagram illustrating a client-side method for providing display device configuration in a remote host environment according to one embodiment of the invention. Note that method 400 may be performed by processing logic which may include software, hardware, or a combination of both. For example, method 400 may be performed by client 208 of FIG. 2.

Method 400 begins at block 401 where a client display system manager hosted by a client determines, during the pre-connect stage, which client display devices are currently active, and creates a list of these client display devices. At block 402, the client display manager collects the display settings for each active client display device and adds the settings to the list of client display devices. The display settings include one or more of display position, orientation, color depth, sub-pixel order, or any other aspects of display resolution. In one embodiment, the client display manager compiles a list of active client display devices and their settings before the client establishes a session with the host.

At block 403, the client connects to the host machine over a network. At block 404, the client transmits a list including the active client display devices and the desired display settings to the host over the network. The client then waits for a notification from the host that the display settings of the relevant VM have been configured based on the client display device settings. At block 405, the client receives the notification from the host specifying the current display settings of the VM, and updates the settings of the client display devices if needed to match the display settings of the VM. The communication between the VM and the client display system devices can then take place using the channel connections established by the VM.

Figure 5:
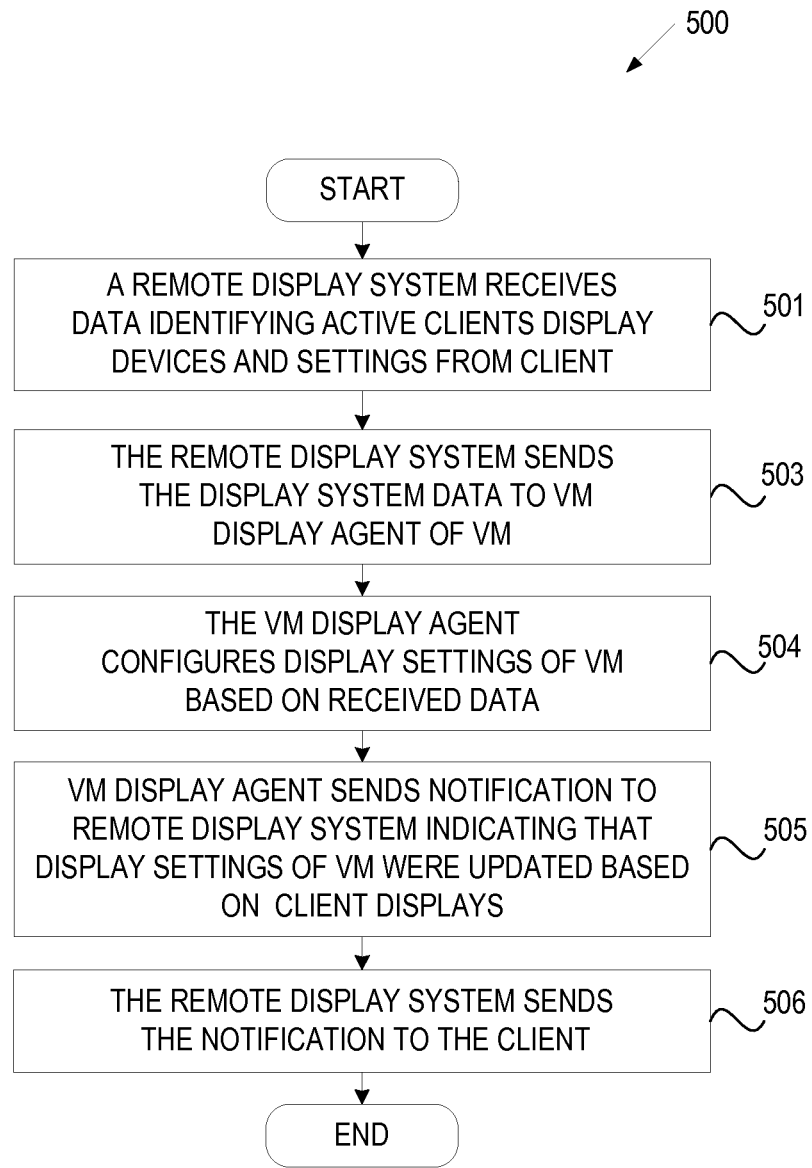
FIG. 5 is a flow diagram illustrating a server-based method for providing display system device configuration in a remote host environment, in accordance with one embodiment of the invention.

FIG. 5 is a flow diagram illustrating a server-side method for providing display device configuration in a remote host environment. Note that method 500 may be performed by processing logic which may include software, hardware, or a combination of both. For example, method 500 may be performed by host machine 201 of FIG. 2.

Method 500 begins at block 501 where a remote display system in a host receives display system data from a client. The display system data may include a list of active display devices on the client and the settings for each active client device. The settings may include display position, orientation, color depth, sub-pixel order, or any other aspects of display resolution.

At block 502, the remote display system sends the client display system data to the VM display agent of the VM. At block 504, the VM display agent receives the client display system data and configures the display settings of the VM. In one embodiment, the VM display agent enables virtual display devices of the VM that have corresponding active client display devices on the list, disables the rest of the virtual display devices of the VM, and configures the enabled virtual display devices based on the settings of the corresponding client display devices. In one embodiment, the VM display agent follows the settings of the client display devices only if such settings are supported by the virtual display devices of the VM.

At block 505, the VM display agent establishes display connections with the client display devices (e.g., via separate channels for individual display devices), and sends a notification to the remote display system that the display settings of the VM were configured based on the client display system data.

At block 506, the remote display system forwards the notification specifying the current display settings of the VM to the client.

Figure 6:
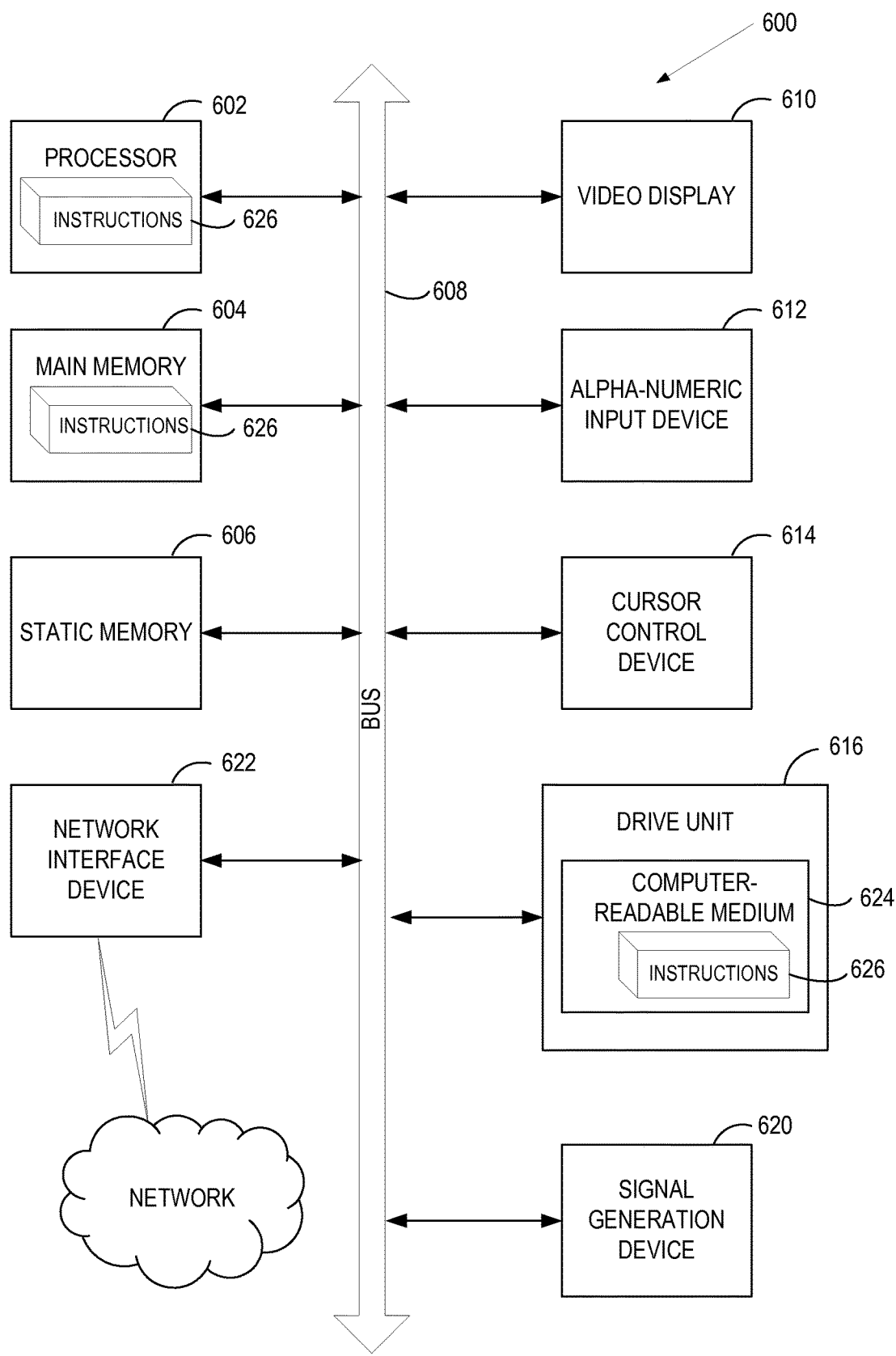
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628 on which is stored one or more set of instructions (e.g., software 622) embodying any one or more of the methodologies of functions described herein. The software 622 may also reside, completely or at least partially, within the main memory 604 and/or within the processing device 602 during execution thereof by the computer system 600; the main memory 604 and the processing device 602 also constituting machine-accessible storage media. The software 622 may further be transmitted or received over a network 620 via the network interface device 608.

The machine-readable storage medium 628 may also be used to store instructions to configure display devices in a VM system as described in embodiments of the invention and implemented by system 100 of FIG. 1 or system 200 of FIG. 2, and/or a software library containing methods that call the above applications. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   identifying, by a client device, a plurality of physical display devices of the client device, wherein the plurality of physical display devices each have settings that are separately adjustable;
   transmitting, by the client device, client display information to a host running one or more virtual machines (VMs), the client display information comprising current settings of each of the plurality of physical display devices, wherein each VM has one or more virtual devices, each of the one or more virtual devices being associated with one of the plurality of physical display devices, wherein the physical display devices associated with the one or more virtual devices communicate with a respective VM via channels designated to individual physical display devices;
   receiving, by the client device, current settings of the virtual device of the one or more virtual devices via a corresponding channel of the designated channels; and
   responsive to determining that the current settings of the virtual device differ from current settings of an associated physical display device, adjusting, by a processing device of the client device, the current settings of the associated physical display device according to the current settings of the virtual device.

2. The method of claim 1, wherein the client display information comprises an identifier of each of the plurality of physical display devices.

3. The method of claim 1, wherein the client display information further identifies one or more alternative settings supported by each physical display device of the client device.

4. The method of claim 1, further comprising receiving a notification from the host that display settings of the corresponding VM has changed, the notification comprising the current settings of the virtual device of the corresponding VM, wherein the current settings of the associated physical display device are adjusted prior to a communication between the corresponding VM and the associated physical display device.

5. The method of claim 1, further comprising receiving a mode operation message from the host, the mode operation message comprising the current settings of the virtual device of the corresponding VM, wherein the current settings of the associated physical display device are adjusted after a communication between the corresponding VM and the associated physical display device.

6. The method of claim 1, wherein the current settings of the virtual device and the associated physical display device comprise at least one of resolution, orientation, display position, color depth, or sub-pixel order.

7. The method of claim 1, further comprising:
detecting a change in the current settings of the associated physical display device during an active display connection between the corresponding VM and the associated physical display device;
sending changed settings of the associated physical display device to the corresponding VM; and
receiving a notification from the corresponding VM indicating that the display information of the corresponding VM was configured based on the changed settings of the associated physical display device.

8. A system, comprising:
a processing device;
a memory; and
a plurality of physical display devices coupled to the processing device and memory, wherein the plurality of physical display devices each have settings that are separately adjustable, wherein the processing device is to:
transmit client display information to a host running one or more virtual machines (VMs), the client display information comprising current settings of each of the plurality of physical display devices, wherein each VM has one or more virtual devices, each of the one or more virtual devices being associated with one of the plurality of physical display devices, wherein the physical display devices associated with the one or more virtual devices communicate with a respective VM via channels designated to individual physical display devices;
receive current settings of the virtual device of the one or more virtual devices via a corresponding channel of the designated channels; and
responsive to determining that the current settings of the virtual device differ from current settings of an associated physical display device, adjust the current settings of the associated physical display device according to the current settings of the virtual device.

9. The system of claim 8, wherein the client display information comprises an identifier of each of the plurality of physical display devices.

10. The system of claim 8, wherein the client display information further identifies one or more alternative settings supported by each physical display device of the client device.

11. The system of claim 8, wherein the processing device is further to receive a notification from the host that display settings of the corresponding VM has changed, the notification comprising the current settings of the virtual device of the corresponding VM, wherein the current settings of the associated physical display device are adjusted prior to a communication between the corresponding VM and the associated physical display device.

12. The system of claim 8, wherein the processing device is further to receive a mode operation message from the host, the mode operation message comprising the current settings of the virtual device of the corresponding VM, wherein the current settings of the associated physical display device are adjusted after a communication between the corresponding VM and the associated physical display device.

13. The system of claim 8, wherein the current settings of the virtual device and the associated physical display device comprise at least one of resolution, orientation, display position, color depth, or sub-pixel order.

14. The system of claim 8, wherein the processing device is further to:
detect a change in the current settings of the associated physical display device during an active display connection between the corresponding VM and the associated physical display device;
send changed settings of the associated physical display device to the corresponding VM; and
receive a notification from the corresponding VM indicating that the display information of the corresponding VM was configured based on the changed settings of the associated physical display device.

15. A non-transitory computer-readable storage medium having computer instructions stored therein, which when executed by a client device, cause the client device to perform a method comprising:
identifying, by the client device, a plurality of physical display devices of the client device, wherein the plurality of physical display devices each have settings that are separately adjustable;
transmitting, by the client device, client display information to a host running one or more virtual machines (VMs), the client display information comprising current settings of each of the plurality of physical display devices, wherein each VM has one or more virtual devices, each of the one or more virtual devices being associated with one of the plurality of physical display devices, wherein the physical display devices associated with the one or more virtual devices communicate with a respective VM via channels designated to individual physical display devices;
receiving, by the client device, current settings of the virtual device of the one or more virtual devices via a corresponding channel of the designated channels; and
responsive to determining that the current settings of the virtual device differ from current settings of an associated physical display device, adjusting, by a processing device of the client device, the current settings of the associated physical display device according to the current settings of the virtual device.

16. The computer-readable storage medium of claim 15, wherein the client display information comprises an identifier of each of the plurality of physical display devices.

17. The computer-readable storage medium of claim 15, wherein the client display information further identifies one or more alternative settings supported by each physical display device of the client device.

18. The computer-readable storage medium of claim 15, wherein the method further comprises receiving a notification from the host that display settings of the corresponding VM has changed, the notification comprising the current settings of the virtual device of the corresponding VM, wherein the current settings of the associated physical display device are adjusted prior to a communication between the corresponding VM and the associated physical display device.

19. The computer-readable storage medium of claim 15, wherein the method further comprises receiving a mode operation message from the host, the mode operation message comprising the current settings of the virtual device of the corresponding VM, wherein the current settings of the associated physical display device are adjusted after a communication between the corresponding VM and the associated physical display device.

20. The computer-readable storage medium of claim 15, wherein the current settings of the virtual device and the associated physical display device comprise at least one of resolution, orientation, display position, color depth, or sub-pixel order.

* * * * *